United States Patent [19]
Pennewiss et al.

[11] Patent Number: 5,773,505
[45] Date of Patent: Jun. 30, 1998

[54] POLYMER EMULSIONS WITH BIMODAL MOLECULAR-WEIGHT DISTRIBUTION

[75] Inventors: Horst Pennewiss, Darmstadt; Claudia Beyer, Seeheim-Jugenheim, both of Germany; Ruediger Jelitte, Bridgewater, N.J.; Bernhard Will, Wiesbaden, Germany; Clemens Auschra, Mainz, Germany; Juergen Omeis, Bickenbach, Germany

[73] Assignee: Roehm GmbH Chemische Fabrik, Darmstadt, Germany

[21] Appl. No.: 744,141

[22] Filed: Nov. 12, 1996

[30] Foreign Application Priority Data

Nov. 11, 1995 [DE] Germany .................. 195 42 120.5

[51] Int. Cl.$^6$ ................................................ C08L 53/00
[52] U.S. Cl. ........................ 524/505; 525/71; 525/302; 525/309
[58] Field of Search .............................. 524/505; 525/71, 525/309, 302

[56] References Cited

U.S. PATENT DOCUMENTS

| | | | |
|---|---|---|---|
| 4,663,642 | 5/1987 | Kameda et al. | 346/217 |
| 5,597,871 | 1/1997 | Auschra et al. | 525/309 |

*Primary Examiner*—Mark L Warzel
*Attorney, Agent, or Firm*—Oblon, Spivak, McClelland, Maier & Neustadt, P.C.

[57] ABSTRACT

The invention relates to polymer emulsions of poly(meth) acrylic acid esters and olefin copolymers suitable for improvement of the viscosity index, for use as oil additives.

The polymer emulsion is formed of a continuous phase of poly(meth)acrylic acid esters and d-oligomers where the esters and oligomers have a bimodal molecular-weight distribution, a stabilizing agent (a graft or block polymerizate of an olefin copolymerizate and methacrylic acid esters), and a disperse phase of olefin copolymerizates distributed in the continuous phase.

9 Claims, No Drawings

POLYMER EMULSIONS WITH BIMODAL MOLECULAR-WEIGHT DISTRIBUTION

BACKGROUND OF THE INVENTION

1. Field of the Invention

The invention relates to polymer emulsions with a bimodal molecular-weight distribution and their use as oil additives.

2. Discussion of the Background

Since the end of the 1970s, solution concentrates of polyalkyl methacrylate (PAMA) and polyolefin additives (OCP) have been available in mixtures that have proven compatible for all practical purposes, so-called "mixed polymers" (H. Pennewiss and P. Neudörfl in "Tribology 2000," 8th Colloquium, Jan. 14–16, 1992, Vol. 1, Ed. W. J. Bar, Technological Academy of Esslingen).

Smaller quantities of a PAMA-OCP graft polymerizate serve as a "compatibilizer" for the two polymer classes, which themselves are incompatible in joint solvents. Customary formulations contain approximately 65–75 parts by weight of PAMA and 25–35 parts by weight of OCP in relation to the dry quantities. Generally, the solvent-like polymer is present in the continuous phase whereas the other polymer is present in the discontinuous, micellar phase. Phase inversion occurs with the addition of non-polar solvents (see R. M. Mortier, S. T. Orszulik, The Chemistry and Technology of Lubricants VCH 1992; DE-A2,905,954, U.S. Pat. No. 4,290,925, DE-A 3,207,291, U.S. Pat. No. 4,677, 151, DE-A 3,207,292, U.S. Pat. 4,622,358, and U.S. Pat. No. 4,665,121).

In the named "mixed polymers," the portion of carrier media that inevitably dissolves the poly(methy)acrylates well and the olefin copolymerizates poorly is approximately 45–65 wt %. Considered as relevant, applicable carrier media primarily are esterols such as dibutyl phthalate, adipic acid octyl ester, or trimethyladipic acid octyl ester. Mineral oils and poly-α-olefins that are good solvents for poly(meth)acrylates and olefin copolymers can be used as well if their dissolving force for olefin copolymerizates is reduced to a sufficient extent through the dissolved poly(meth)acrylates therein.

Not only the indispensable effect of improving the viscosity index (VII) but also something of a dispersion/detergent effect can be expected of modern oil additives.

The solutions of the state of the art involve the exploitation of complex behaviors of both polymer additive classes in cooperation with the "compatibilizer" and the solvent system. These so-called "mixed polymers," which combine the advantages of both compound classes, have proven exceptional in practice, but there still remains the desire for additive concentrates that also exhibit an effective dispersant effect when applied. Simultaneously, however, still other perspectives such as compatibility with elastomers and stability and viscosity behavior of the emulsions formed are to be considered (see Ullmann's Encyclopedia of Industrial Chemistry, 5th Edition, Vol. A15, pp. 448–465, 463ff, VCH 1990).

SUMMARY OF THE INVENTION

It has now been found that the concentrated polymer emulsions according to the invention, with a bimodal molecular weight distribution of additives, fulfill the above technological requirements. Therefore, the invention relates to concentrated polymer emulsions, PEM, of poly(meth) acrylic acid esters and olefin copolymers suitable for improvement of viscosity index for use as oil additives, whereby the disperse phase of olefin copolymers (OCP) is distributed in a continuous phase of poly(meth)acrylates with a bimodal molecular weight distribution, and which contains, as a stabilizing agent for the phase distribution, a graft or block copolymerizate of olefin copolymerizates and (meth)acrylic acid esters (OCP-PAMA) and co-oligomers and/or low copolymers (d-oligomers) as carrier.

DETAILED DESCRIPTION OF THE INVENTION

The present invention makes use of the fact that co-oligomers and/or low copolymers (d-oligomers), with an effective dispersant capability, represent suitable carrier media for the subject polymer emulsions because they dissolve poly(meth)acrylates well and olefin copolymers poorly. Thus, it is possible to partially or completely replace the carrier media in customary use today with d-oligomers. Based on the excellent dispersant effect, on the other hand, there is the option, in the production of lubricant oil formulations, of eliminating the further addition of so-called ashless dispersants through Dl-packets or of replacing a large portion of the "ashless dispersants" of the Dl-packet.

The use of d-oligomers (d-OM) as carrier media for concentrated polymer emulsions, PEM, of poly(meth) acrylate and olefin copolymers requires that the d-OM, preferably present as low polymers with an average molecular weight range of 5000–30,000 daltons, be compatible with the high polymer poly(meth)acrylic acid esters preferably having an average molecular weight of 50,000–500,000 daltons, where the determination of the molecular weight is by size exclusion chromatography, SEC, see H. F. Mark et al., Encyclopedia of Polymer Science and Technology, Vol. 10, pp. 1–19, J. Wiley 1987, incorporated herein by reference.

Therefore, the concentrated polymer emulsions of the invention, PEM, are emulsions of poly(meth)acrylates (PAMA) and olefin copolymerizates (OCP) in d-oligomers (d-OM) as the carrier medium, where OCP-PAMA copolymerizates function as emulsifiers.

According to the invention, increased compatibility is achieved when the same or similar polar copolymers are incorporated into the high polymer poly(meth)acrylates (HP) as are contained in the d-oligomer. Preferably, the concentrations of the monomers and polymers are measured so that the content of polymer additive in the carrier medium, d-OM, is 40–90 wt %. The bimodal molecular-weight distribution is established in that the low-molecular-weight components are generally present in an (average) molecular weight range of 5000–30,000, and the high polymer poly(meth)acrylates, HP, are present in a range of 50,000–500,000.

The d-oligomers, d-OM, functioning in or as the carrier medium, used according to the invention, may include, for example, the following components:

A) 60–95 wt % of at least one (meth)acrylic acid ester of formula I

wherein R stands for hydrogen or methyl and $R_1$ for an optionally branched alkyl residue or a cycloalkyl residue with 4–32, preferably 6–30, and particularly 8–26, carbon atoms in the alkyl and cycloalkyl residue, and B) 0–40 wt %, preferably 5–40, of at least one monomer of the group of (meth)acrylic acid esters of formula II

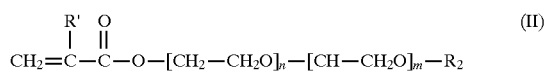

wherein R' stands for hydrogen or methyl and $R_2$ for an alkyl or an aryl residue with 1–50 carbon atoms, whereby $R_2$ may itself be substituted by nitrogen or sulfur and wherein n may represent a number between 5–100 and m a number between 0–100, and/or hydroxyalkyl(meth)acrylic acid esters of formula III

wherein R" stands for hydrogen or methyl and $R_3$ for an alkyl residue substituted with at least one hydroxyl group, with 2–26, particularly 2–12 carbon atoms, and/or C) 0–30 wt % at least of a monomer, containing nitrogen, of formulas IV-A and/or IV-B

wherein X stands for oxygen, —NH, or —$NR_5$, and

R'" stands for hydrogen or methyl and $R_5$, $R_4$ for an alkyl residue, possibly branched, substituted with at least one group —$NR_6R_7$, with 2–20, preferably 2–6, carbon atoms, whereby $R_6$ and $R_7$ independently of one another stand for an alkyl residue with 1–20, preferably 1–6, carbon atoms, or wherein $R_6$ and $R_7$ form a 5- or 6-membered ring, including the nitrogen atom and possibly another nitrogen or oxygen atom, which may be substituted with a $C_1$–$C_6$ alkyl and wherein $R_5$ stands for an alkyl residue with 1–6 carbon atoms,

wherein Bs stands for a 5- or 6-membered heterocycle, preferably pyridine, carbazole, imidazole, and particularly a pyrrolidone residue, D) 0–75 parts by weight relative to the sum of A), B), and C), at least one 1-alkene with 4–32, preferably 4–22, carbon atoms in the molecule, with the standard that A), B), and C) total 100 wt %. Cited as possible monomers of formulas IV-A and IV-B are, for example, dimethylaminopropyl methacrylamide and morpholinoethyl methacrylate or N-vinylpyrrolidone.

Of particular interest are, among others, co-oligomers and low copolymers, d-OM, in which the residue, $R_2$, in formula II is substituted with at least one group —$NR_3R_4$, whereby $R_3$ and $R_4$ independently of one another stand for an alkyl residue with 1–20 carbon atoms and wherein $R_3$ and $R_4$ form a 5- or 6-membered ring including the nitrogen atom and possibly another oxygen or nitrogen atom, which can be substituted with a $C_1$–$C_6$ alkyl residue.

Included are, for example, the dimethylamino group, diethylamino group, methylisopropylamino group, piperidino group, pyrrolidino group, pyridine group, and morpholino group, among others. Co-oligomers with dispersant action, of the named type, are also described in German Patent Application P 44 23 358.2, incorporated herein by reference.

The mean molecular weights ($M_w$) of the co-oligomers and low copolymers, d-OM, are preferably 3000–30,000 daltons, particularly 5,000–30,000 daltons (determination by gel permeation chromatography, see H. F. Mark et al., Encyclopedia of Polymer Science and Technology, Vol. 10, pp. 1–19, J. Wiley, 1987; J. V. Dawkins, Comprehensive Polymer Science, Vol. 1, p. 231 (1989), Pergamon Press).

As monomers of formula I, particularly (meth)acrylic acid esters of mixtures of higher alcohols, especially of the range $C_9$–$C_{20}$, particularly $C_{10}$–$C_{18}$, with alternating degrees of branching in the range of 25 to over 80%, for example, those that accumulate from industrial production methods such as oxosynthesis, can be considered.

Included, for example, are the esters of the so-called DOBANOL® alcohols (products of the Shell Company), the so-called ALFOL® alcohols (products of the Condea Company), the so-called LOROL® alcohols, and the tallow fat alcohols, among others.

Of particular interest are, for example, esters of alcohol mixtures of isomeric isodecyl alcohols, esters of alcohol mixtures from isomeric isoundecyl alcohols, and furthermore, esters of an alcohol mixture with an average carbon number of 13.2–13.8, and a predominant quantity of $C_{12}$–$C_{15}$ alcohols (DOBANOL® 25L). Also, the esters of cyclic alkanols, for example, with 5–8 carbon ring atoms such as cyclopentanol, cyclohexanol, cyclooctanol, benzyl alcohol, and alkyl-substituted cyclohexanols, for example, 4-tert-butylcyclohexanol, can be used well.

As compounds of formula II, the (meth)acrylic acid esters of alkoxylated aliphatic alcohols, such as alkoxylated butanol and other alkoxylated alcohols proceeding from: methanol, ethanol, propanol, pentanol (+ isomers), hexanol (+ isomers), dyclohexanol, methylcyclohexanol, 2-ethylhexanol, and higher aliphatic univalent alcohols such as isodecyl alcohol, isoundecyl alcohol, isotridecyl alcohol, fatty alcohols produced from natural raw materials, etc., can be used. Furthermore, the following can also be used: alkoxylated phenols, for example, based on: phenol, alkyl-substituted phenols, for example, t-butylphenol, 2,6-dimethylphenol, isomeric mixtures, technical-grade alkylphenols, for example, octylphenol, nonylphenol, dinonylphenol, naphthol, and alkyl-substituted naphthol. Also useful are EO/PO products of the addition to substituted alcohols, for example, furfurol, tetrahydrofurfurol, 2-methoxybutanol, 3-methoxybutanol, 2-dimethylaminoethanol 2-diethylaminoethanol, 1-dimethylamino-2-propanol, 3-dimethylamino-1-propanol, 2-morpholinoethanol, 2-(2-pyridyl)ethanol, N-(2-hydroxyethyl)-piperidine, N-(2-hydroxyethyl)pyrrolidine, and N-(2-hydroxyethyl)pyrrolidone.

Included, for example, are alcohols that represent a (statistical) addition product of ethylene oxide or propylene oxide to an alcohol such as butanol. The molecular weight of the preferred monomers of formula II is in the range of approximately 2000 daltons. However, this does not represent a limitation. Depending on the degree of alkoxylation (n+m, formula II) and depending on the amount of the residue, $R_2$, higher molecular weights of up to approximately 5000 or lower molecular weights to approximately 500 daltons can also be achieved.

The monomers of formula II may themselves be present as a mixture consisting of methacrylates of the different alkoxylated alcohols described above.

The monomers of formula D) represent the radical, polymerizable 1-alkenes with 4–32 carbon atoms. $C_4$–$C_6$-alkenes can be named in particular, for example, 1-decene, 1-octene, 1-dodecene, 1-tetradecene, and 1-hexadecene, as well as 1-octadecene and 1-eicosene.

The production of the oligomers (d-OM) with dispersant action is undertaken according to the rules and experience of radical polymerization known to those skilled in the art (see C. H. Bamford, Encyclopedia of Polymer Science, Vol. 13, p. 708, 2nd Edition, 1988)).

As already recognized in the state of the art, basic concentrated polymer emulsions, PEM, made accessible in the context of the present invention, are composed—on the polymer side—of olefin copolymerizates (OCP) on the one hand and polyalkyl(meth)acrylates (PAMA) on the other hand, as well as a copolymerizate of the two polymer classes with emulsifying action. According to the present invention the above d-OM are added to these components and it is preferred that the high polymer poly(meth)acrylates contain, through polymerization, comonomers of equal or similar polarity such as are contained in the d-oligomers.

Accordingly, the polyalkyl(meth)acrylates HP according to the present invention preferably comprise:

a) 40–95 wt %, preferably 60–95 wt %, of at least one meth)acrylic acid ester of formula (I-A)

wherein $R^{IV}$ stands for hydrogen or methyl and $R'_1$ stands for an optionally branched alkyl residue with 6–30, particularly 6–24, carbon atoms, and b) 5–30 wt %, preferably 5–15 wt%, of the monomers of (II) and (III), and/or (IV) summarized above as B).

Of considerable practical significance is the finding that compatibility can be produced through the incorporation of hydroxyalkyl(meth)acrylic acid esters of formula III, for example, hydroxyethyl methacrylate. The methacrylic acid esters I-A generally correspond to those applied in practice, for example, those used as monomers in PAMA of the state of the art.

Examples of monomers of formula I-A in particular are mixtures of quite different kinds of esters. Thus, for example, mixtures of the methacrylic acid esters of non-branched $C_{16}$–$C_{18}$ alcohols, [for example,] the methacrylic acid ester of an isodecyl alcohol, have proven themselves useful.

Of further significance are (meth)acrylic acid esters of technical-grade alcohol mixtures in the range of $C_{11}$–$C_{16}$, such as, DOBANOL® alcohols (products of the Shell Company) or ALFOL® alcohols (products of the Condea Company).

The olefin copolymerizates to be used according to the invention are known as such. Primarily these are polymerizates contain ethylene, propylene, butylene, and/or other α-olefins with 5–20 carbon atoms, such as those that have already been recommended as improvers of VI [viscosity index]. The mean molecular weight, $M_w$, generally is 10,000–300,000, preferably between 50,000 and 150,000. In the process, the olefin copolymerizate can be degraded to increase the shear stability in a manner known, such as, by thermal oxidation, to an approximate molecular weight range of $1 \times 10^5$.

Such olefin copolymerizates are described, for example, in German Published Application Nos. DE-A-1,644,941, DE-A-1,769,834, DE-A-1,939,037, DE-A-1,963,039, and DE-A-2,059,981, all incorporated herein by reference. If the basic copolymerizate consists of a hydrogenated polyisoprene or copolymerizate with styrene, commercial hydrogenated products (for example, the commercial product SHELLVIS® 50, 200, or 250) are preferred. Particularly good for use are ethylene-propylene copolymers; terpolymers with the known ter components such as ethylidene-norbornene (see Macromolecular Reviews, Vol. 10 (1975)) are also possible, but their tendency to undergo crosslinking in the aging process must be considered. The distribution can to a large extent be statistical, but sequence polymers with ethylene sequences can also be used to advantage. The ratio of the monomers, ethylene-propylene, is variable within certain limits which can be set at approximately 75% for ethylene and approximately 80% for propylene as the upper limits. For example, an ethylene-propylene copolymerizate with a 50-wt % ethylene portion and molecular weight, $M_w$, of 150,000 can be used. As a result of its reduced tendency toward solubility in oil, polypropylene is less suitable than ethylene-propylene copolymers.

The molecular weights ($M_w$) of polyalkyl(meth)acrylate are, as already stated, in the range of 50,000–500,000.

A method providing the polymer emulsions, PEM, according to the invention can be performed as follows:
1. Production of the emulsifier A mixture of OCP, the methacrylic acid ester of formula I-A, preferably a mixture of esters with different carbon numbers, and at least one monomer named in B), such as a hydroxyalkyl (meth)acrylic acid ester like hydroxyethyl (meth)acrylate, are put into a suitable reaction vessel, expediently equipped with a stirrer, thermometer, reflux cooler, and metering line.

After dissolution in an inert atmosphere such as nitrogen while heating, for example, to 110° C., a portion of a customary radical initiator, for example, from the group of per esters, can be added, for example, at approximately 0.7 wt % in relation to the monomer amount.

Afterwards, over several hours, for example, 3.5 h, a mixture of the remaining monomers according to I-A) and—as stated above—B) with the addition of other initiators is added, for example, at approximately 1.3 wt % in relation to the monomer. In the process, for example, the hydroxyethyl (meth)acrylate can be in a weight ratio of approximately 1:20 to the total of the other (meth)acrylic acid esters. Expediently, some time after the end of such addition, some amount of initiator is fed again, for example, after 2 h. The total duration of polymerization may be assumed to be, for example, approximately 8 h, as a guiding value. After the end of polymerization, the mixture is diluted expediently with a suitable solvent, such as a phthalic acid ester like dibutyl phthalate. Generally, an almost clear, viscous solution is obtained.
2. Production of the emulsion The emulsifier produced is put into a suitable container provided with a stirring device (Inter-Mig stirrer), with the application of heat, for example, to 100° C. The polyolefin, preferably an ethylene-propylene or ethylene-propylene diene copolymerizate, for example, an OCP degraded by heat and oxidation, is added.

After adding the polyolefin, the temperature is increased, for example, to 140° C. and the mixture is dispersed to a stable emulsion over several hours. Given as a guiding value is a polymerizate content of approximately 60 wt %.
3. Production of the polymer emulsion according to the invention by mixing of the OCP emulsion with d-oligomer The above-described OCP emulsion is put into a reaction vessel provided with a stirrer, thermometer, and metering line, and the emulsion is advantageously diluted with the d-oligomer, for example, in a ratio of approximately 100:60 parts by weight, at an elevated temperature, for example, approximately 50° C. A stable emulsion is obtained.

EXAMPLES

The viscosity is determined according to DIN [German Institute for Standardization] 51 562 (Ubbelohde-viscometer).

The viscosity index (VIB) is determined according to DIN ISO 2909.

A further understanding will now be provided by reference to certain specific examples which are provided herein for purposes of illustration only and are not intended to be limiting.

Example 1 a) Production of the emulsifier (=OCP-p-PAMA)

The following mixture is put into a 2-L, four-necked flask with a stirrer, thermometer, reflux cooler, and metering line:

78.0 g of ethylene-propylene copolymerizate (50% ethylene; $M_w$=150,000)

442.0 g of Vestinol OA 2.6 g of hydroxyethyl methacrylate 24.8 g of the methacrylic acid ester of a nonbranched $C_{16,18}$-alcohol mixture 30.4 g of methacrylic acid ester of an isodecyl alcohol After dissolution in a nitrogen atmosphere at 110° C., 0.4 g of tert-butyl peroctoate is added. A mixture of 19.0 g of hydroxyethyl methacrylate 181.0 g of the methacrylic acid ester of a nonbranched $C_{16,18}$-alcohol mixture 222.0 g of methacrylic acid ester of an isodecyl alcohol 5.4 g of tert-butyl peroctoate is then added, evenly distributed over a period of 3.5 h.

2 h after the end of the addition, 1 g of tert-butyl peroctoate is fed in. The total polymerization time is 8 h. After the end of polymerization, the mixture is diluted with 590.0 g of dibutyl phthalate. An almost clear, viscous solution is obtained.

Polymerizate content: 35.1%

Viscosity at 100° C.: 70 mm²/sec

Viscosity at 40° C.: 250 mm²/sec

Viscosity (10% in mineral oil $_h$ 100° C. =5.5 mm²/sec);

100° C.=9.7 mm²/sec

40° C.=53.3 mm²/sec

VIB=148 b. Production of the OCP emulsion 306.4 g of emulsifier are put at 100° C. into a 1-L Witt pot with an Inter-Mig stirrer (ratio stirrer/container diameter= 0.7; 1 current breaker, stirring rotation rate approximately 300 rpm). While stirring, 193.6 g of ethylene/propylene copolymerizate with 50% ethylene, broken down by heat and oxidation from $M_w$=200,000 to $M_w$=100,000 are added in small portions. After adding the OCP, the temperature is increased to 140° C. and the mixture is dispersed to a stable emulsion within 6 h.

Polymerizate content: 60.2%

Viscosity at 100° C.: approximately 6000 mm²/sec

Viscosity (2.4% in mineral oil $_h$ $_{100°}$ C. =5.5 mm²/sec);

100° C.=11.6 mm²/sec

40° C.=71.6 mm²/sec

VIB=142 b) Production of the polymer emulsion according to the invention by mixing of the OCP emulsion with d-oligomer (d-OM)

830 g of the 60.2% OCP emulsion are put into a 2-L three-necked round flask with a stirrer, thermometer, and metering line, and diluted at approximately 50° C. with 500 g of d-oligomer (viscosity at 100° C.=360 mm²/sec) . A stable emulsion (2 h at 4000 rpm in the centrifuge, no separation) is obtained.

Viscosity at 100° C.=580 mm²/sec.

Example 2

Production of the d-oligomer

In the 3-L flask with a magnetic stirrer, thermometer, distillation top, and $N_2$ input line, 1120 g of Tetralin are filled, then heated to 140° C. under $N_2$. A mixture of:

347.8 g of the methacrylic acid ester of alkoxylated butanol (=statistical addition product of ethylene oxide and propylene oxide to butanol or ethylene glycol monobutyl ether, $M_{w=2000}$ daltons)

692.1 g of the methacrylic acid ester of isomeric isodecyl alcohols 640.0 g of methacrylic acid ester of the alcohol, Dobanol 25 L (Shell AG [Joint-Stock Company]), mixture of $C_{11}$–$C_{16}$ alcohols 10.1 g of 2,2-bis-(t-butylperoxy)butane at 50 wt % dissolved in aliphatic compounds (Interox Bu-50-Al product of the Interox Corp.) is continuously metered into the hot solvent over 3 h. The material with the monomer mixture is heated to 50° C. and stirred. At the end of the addition, 2.07 mL of initiator solution are added at 140° C., 16 times, at intervals of 30 min in each case. 30 min after the last addition, the temperature is cooled to 60° C. and the Tetralin is distilled off in vacuum (2 mbar) up to a sump temperature of 163° C.

Yield: 1663 g of an oligomer with dispersant action.

Obviously, numerous modifications and variations of the present invention are possible in light of the above teachings. It is, therefore, to be understood that within the scope of the appended claims, the invention may be practiced otherwise than as specifically described herein.

This application is based on German Patent Application 195 42 120.5 filed Nov. 11, 1995, published as DE19542120 on May 15, 1997, incorporated herein by reference.

What is claimed as new and desired to be secured by Letters Patent of the United States is:

1. A polymer emulsion comprising

1.) a continuous phase comprising poly(meth)acrylic acid esters and one or more d-oligomers, the poly(meth) acrylic acid esters and oligomers having a bimodal molecular-weight ($M_w$) distribution, 2.) a graft or block polymerizate of an olefin copolymerizate and one or more methacrylic acid esters, and 3.) a disperse phase of at least one olefin copolymerizate, wherein said disperse phase is distributed in the continuous phase.

2. The polymer emulsion according to claim 1, wherein the bimodal molecular-weight distribution of the continuous phase comprising poly(meth)acrylic acid esters and d-oligomers is such that the weight average molecular weight ($M_w$) of the poly(meth)acrylic acid esters is in the range of 50,000–500,000 g/mol, and the weight average molecular weight ($M_w$) of the d-oligomers is in the range of 3000–30,000 g/mol.

3. The polymer emulsion according to claim 1, wherein the olefin copolymerizate has a weight average molecular weight of 5000–150,000 g/mol.

4. A polymer emulsion according to claim 1, wherein said poly(meth)acrylic acid ester polymer is a copolymer of a) at least one (meth)acrylic acid ester of the formula (I-A)

wherein $R_{IV}$ is hydrogen or methyl, and $R_1'$ is a branched or unbranched alkyl residue having 6–30 carbon atoms, and b) at least one monomer selected from the group consisting of (i) (meth) acrylic acid esters of formula II

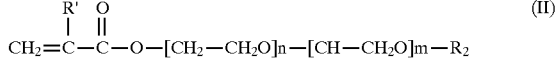 (II)

wherein R' is hydrogen or methyl and $R_2$ is an alkyl or an aryl residue with 1–50 carbon atoms, wherein n represents a number between 5–100 and m a number between 0–100, (ii) hydroxyalkyl(meth)acrylic acid esters of formula III

 (III)

wherein R" is hydrogen or methyl and $R_3$ is an alkyl group substituted with at least one hydroxyl group, said alkyl group having 2–26 carbon atoms, (iii) a nitrogen containing monomer of the formula IV-A or IV-B

 (IV-A)

wherein X is oxygen, —NH, or —$NR_5$,

R''' is hydrogen or methyl, and $R_4$ is branched or unbranched alkyl, substituted with at least one group —$NR_6R_7$, wherein $R_6$ and $R_7$ in combination have 2–20 carbon atoms, or $R_6$ and $R_7$ independently of one another are alkyl residues with 1–20 carbon atoms, or $R_6$ and $R_7$ form a 5- or 6-membered $C_1$–$C_6$ alkyl substituted or unsubstituted heterocyclic ring with the nitrogen atom, and wherein $R_5$ is an alkyl residue with 1–6 carbon atoms,

 (IV-B)

wherein Bs is a 5- or 6-membered heterocyclic ring selected from the group consisting of pyridine, carbazole, imidazole, and pyrrolidone, (iv) a 1-alkene having 4–32, carbon atoms in the molecule, and mixtures thereof.

5. A polymer emulsion according to claim 4, wherein at least one of said monomers (b) is a hydroxyalkyl (meth) acrylic acid ester of the formula III

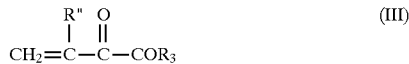 (III)

wherein R" is hydrogen or methyl and $R_3$ is an alkyl group substituted with at least one hydroxyl group, said alkyl group having 2–26 carbon atoms.

6. A polymer emulsion according to claim 5, wherein said monomer (a) is a methacrylic acid ester of a nonbranched $C_{16-18}$-alcohol mixture.

7. A polymer emulsion according to claim 4 wherein at least one of the (meth)acrylic acid esters of said graft or block polymer contains a hydroxyl group on the alcohol portion of said ester.

8. A polymer emulsion according to claim 7 wherein the olefin copolymerizate used to form said graft or block copolymer comprises an ethylene-propylene copolymer.

9. A polymer emulsion according to claim 8 wherein the olefin copolymerizate of said disperse phase comprises a polymer which has been subjected to thermal oxidation to decrease its molecular weight.

* * * * *